United States Patent Office 2,866,015
Patented Dec. 23, 1958

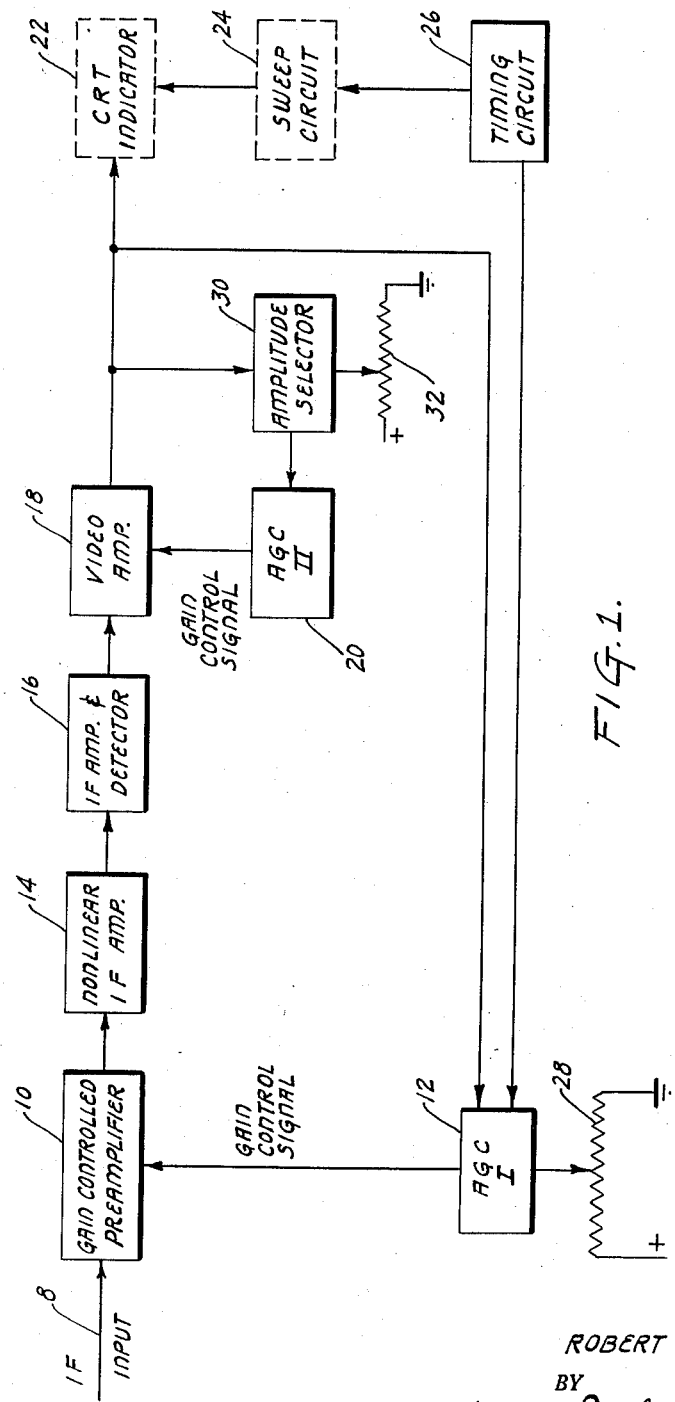

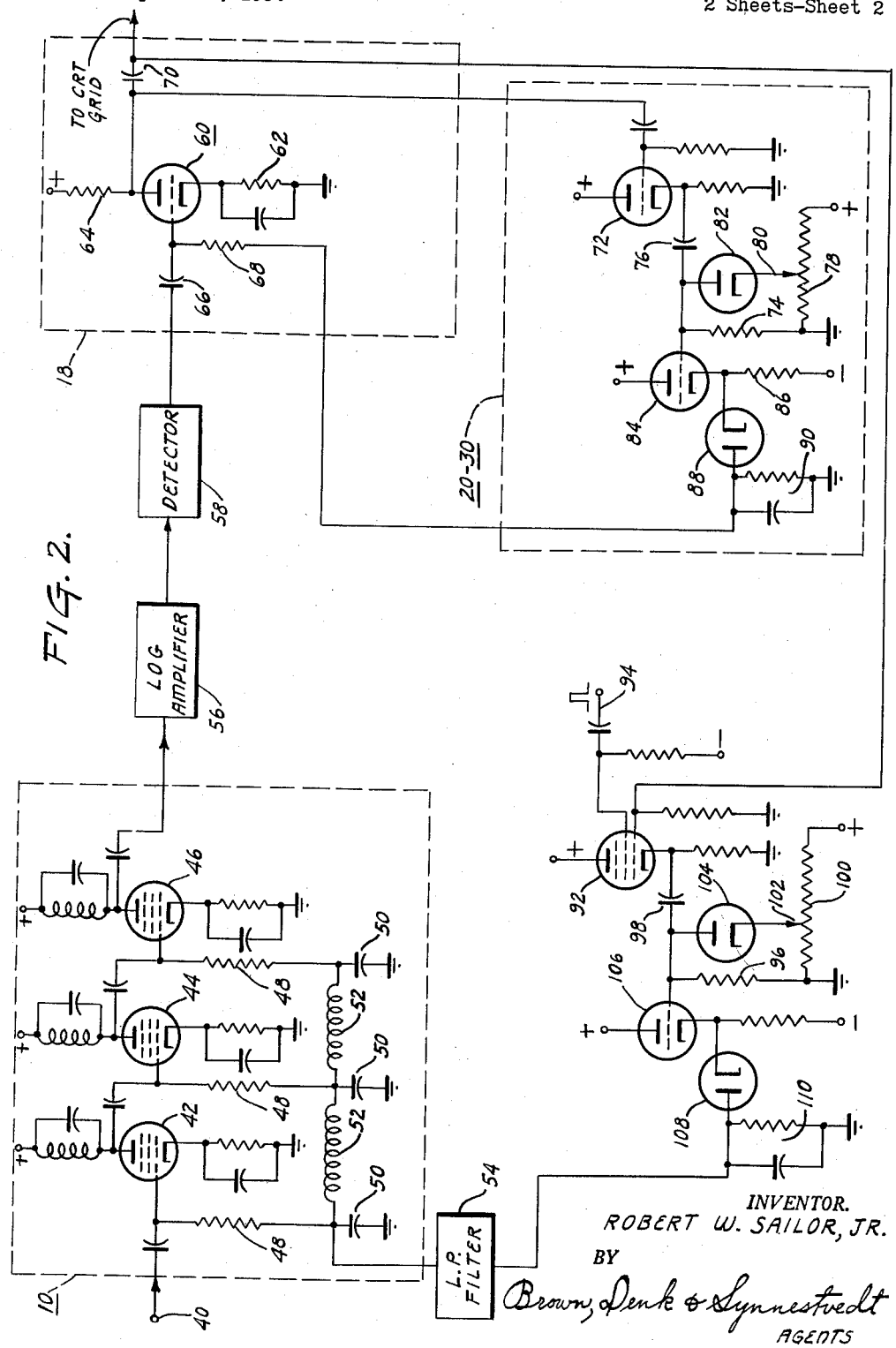

2,866,015

GAIN CONTROL SYSTEM

Robert W. Sailor, Jr., Bristol Township, Bucks County, Pa., assignor to Philco Corporation, Philadelphia, Pa., a corporation of Pennsylvania Application April 22, 1954, Serial No. 424,812

14 Claims. (Cl. 179—171)

This invention relates to signal amplifier systems and more particularly to amplifiers for controlling the dynamic range of signals which may vary in dynamic range and/or average amplitude from time to time.

There are many electrical systems now in use which will operate efficiently only when the dynamic range of input signals applied thereto is precisely equal to the range with which the system is designated to operate. In many of these systems the absolute amplitudes of the maximum and minimum signals must be held exactly equal to preselected levels. A familiar system requiring strict limitations on the applied signal is the intensity modulated cathode-ray tube indicator normally employed in radar systems. The operation of the invention will be described with occasional reference to such intensity modulated cathode-ray tube indicator systems, but it should be remembered that the present invention is not limited to circuits designed to operate with such indicators.

Those familiar with the operation of intensity modulated cathode-ray tube indicators understand that, with the cathode or intensity control grid of a cathode-ray tube indicator held at a fixed bias potential, a certain minimum potential is required on the other of these two electrodes in order to cause a barely visible trace of light to appear on the indicator screen. This trace or spot of light is caused to scan over the surface of the tube by deflecting the cathode-ray beam that produces the spot. This results in a very dim background illumination on the screen of the indicator tube. Target signals are displayed by changing the amplitude of the potential on the intensity control grid by an amount proportional to the amplitude of the target signal to be represented and in a direction to cause a brighter spot to appear on the screen. It is well known that signals lying between the above-mentioned minimum value which will cause a trace of light to appear, and some larger limiting value, will produce spots or traces which vary in intensity with the amplitude of the signal producing them. However, as the amplitude of the intensity control signal is increased beyond this larger limiting value, a point is reached at which no increase in brightness results from an increase in amplitude of the intensity control signal. This point is generally referred to as the saturation level of the indicator.

It is known to those familiar with circuits of this type that if the gains of the amplifiers preceding the indicator change for some reason, the minimum signal to be displayed may fall below the level necessary to provide a visible indication and information will be lost, or the minimum signal will increase beyond the minimum necessary to cause a trace to appear and the range over which signals of different contrast may be displayed will be compressed. Similarly a change of gain may cause the largest amplitude signal to be displayed to exceed the saturation level so that contrast is lost between that signal and a signal of lower amplitude which just causes saturation of the indicator. If the gain of the amplifier is too low the maximum amplitude signal to be displayed may not reach the saturation level and again the full range of the indicator will not be used.

Since there are two limiting conditions to be met, two controls are required. Prior art systems depended upon an adjustable gain control in the intermediate frequency amplifier or the video amplifier supplying the cathode-ray tube to match the dynamic range of the input signal to the dynamic range of the indicator, and upon an adjustment on the bias circuit for simultaneously adjusting the bias potential of the cathode-ray tube to cause the minimum signal to be barely visible. Normally the gain control must be adjustable over wide limits in order to adapt the radar system to the various types of terrains and targets that it must view. The result is that, for certain ranges, large amplitude signals are so compressed that all contrast is lost, while for other ranges the small amplitude signals are so reduced in size that they are indistinguishable from the ever present noise signals. A further disadvantage of prior art systems lies in the fact that the bias control is usually manual so that the system as a whole is at best only semiautomatic. As mentioned earlier, problems of this nature are not limited to intensity modulated indicators or to radar systems but are found in many different electronic circuits, for example in electronic servomechanisms and in time division multiplex systems of the pulse amplitude modulation type.

Therefore it is an object of the present invention to provide a new and improved system for controlling the dynamic range of a signal.

It is a further object of the present invention to provide a new and improved gain control system which will match the dynamic range and absolute level of a signal to the characteristics of the device to which it is supplied.

Another object of the present invention is to provide an automatic gain control system for maintaining the amplitude range of a signal within preselected adjustable limits.

In general, these and other objects of the present invention are accomplished by means of a novel amplifier system comprising three amplifier circuits in cascade, the intermediate amplifier having a gain characteristic such that larger amplitude signals are amplified to a different degree than smaller amplitude signals. The initial and final amplifiers in the cascade arrangement are variable gain devices, and means are provided for sampling the signals at the output of the cascade arrangement at two different amplitude levels and for adjusting the gains of the initial and final amplifiers to cause the signals at the output of the cascade arrangement to have maximum amplitudes within selected time intervals which are equal to two preselected reference levels.

For a better understanding of the present invention, together with other and further objects thereof, reference should now be made to the accompanying drawings in which:

Fig. 1 is a block diagram of one preferred form of the present invention; and

Fig. 2 is a more detailed diagram of a preferred embodiment of the present invention.

In Figs. 1 and 2 the invention is illustrated as embodied in the intermediate frequency amplifier and video amplifier portions of a radar receiver. As the description of the invention proceeds, it will become clear to the reader that the change from intermediate frequency to video frequency is not essential to operiaton in accordance with the invention. In other words the invention could be embodied in a circuit operating entirely at audio frequency or entirely at intermediate frequency. However, in a radar receiver certain economies in the number of amplifier stages required at each frequency are achieved by the arrangements of Figs. 1 and 2.

Again it should be remembered that the circuit is not limited in its application to radar systems, this application being chosen only as a typical use of the invention.

Referring now to Fig. 1, an intermediate frequency signal, derived from some circuit such as the mixer of a conventional radar system, is supplied to the input 8 of a gain controlled preamplifier 10. The intermediate frequency signal is impressed with the modulation of the energy returned to the system antenna resulting from the reflection of the transmitted energy from objects in space. Therefore the signal will contain peaks of different amplitudes representing individual objects. Superimposed on this modulation is a further modulation resulting from noise signals picked up by the antenna or generated within the receiver. The preamplifier 10 is so constructed that the over-all gain thereof is a function of the amplitude of the signal received from an automatic gain control circuit 12. There are two gain control circuits present in the system of Fig. 1, and for this reason block 12 has been given the legend AGC-I.

The output of preamplifier 10 is coupled to the input of a nonlinear intermediate amplifier 14. In a radar receiver, amplifier 14 normally would have a logarithmic characteristic in order to compress the dynamic range of received radar echo signals. However, in other embodiments of the invention the gain control characteristic may be other than logarithmic, the only requirement being that the amplifier have a different over-all gain for low amplitude signals than it does for larger amplitude signals.

In the present embodiment, the output of nonlinear amplifier 14 is supplied to the input of an intermediate frequency amplifier and detector 16 which further amplifies the intermediate frequency signal and converts it to video frequency. However, it will be understood that such additional amplification of the intermediate frequency signal might be omitted, as might also the conversion to video frequency, neither of which functions constitute an essential part of a system in accordance with the invention. The video signals appearing in the output of amplifier detector 16 are supplied to the input of video amplifier 18.

Video amplifier 18 may contain one or more individual amplifier stages, and the gain of at least one of these stages is controlled in response to the output from a second automatic gain control circuit 20. For convenience of reference, circuit 20 is designated AGC-II. If the conversion to video frequency is omitted the video amplifier 18 would be replaced with an intermediate frequency amplifier, the gain of which can be controlled in response to the signal from circuit 20.

The output of video amplifier 18 is supplied to the input of the utilization device, in this example the intensity modulated cathode-ray tube indicator 22. Cathode-ray tube indicator 22 is supplied with deflection signals from a sweep circuit 24. The broken lines of blocks 22 and 24 indicate that they are not part of the invention per se. These deflection signals are caused to occur in a preselected time sequence by signals supplied by a timing circuit 26. In a radar system the start of each sweep is normally synchronized with the transmission of energy pulses from the antenna. This synchronism may be achieved by supplying additional control signals from timing circuit 26 to the transmitter of the radar system (not shown in Fig. 1).

The output of video amplifier 18 is also supplied to one input of automatic gain control circuit 12. Gain control circuit 12 is normally incapable of responding to signals from video amplifier 18. However, this circuit is rendered operative to respond to these signals by gate signals supplied from timing circuit 26. The times of occurrence of these gate signals are so chosen that only signals in the lowest amplitude range to be processed actuate automatic gain control circuit 12. In a typical radar system receiver this can be accomplished by causing the gate signals to occur at times just preceding the transmission of a high energy pulse from the system antenna. At these times the only signals normally appearing in the output of the video amplifier of a radar receiver are random noise signals. Automatic gain control circuit 12 is supplied with a reference level signal from an external source which is represented in Fig. 1 by the adjustable potentiometer 28 connected between two points of different potential.

The output of video amplifier 18 is further supplied to amplitude selector circuit 30. One preferred form of amplitude selector circuit will be described in greater detail in connection with the description of Fig. 2, but in general circuit 30 comprises means which provide a substantially constant amplitude output signal for input signals below a certain reference level determined by a reference level source 32 and a variable output signal in response to signals which exceed this reference level. Preferably the amplitude of the signal produced is proportional to, or at least a direct function of, the extent to which the signals exceed the reference level. In Fig. 1 the reference level source 32 is illustrated as an adjustable potentiometer. The output signal of amplitude selector 30 is supplied to the input of automatic gain control circuit 20 which generates a signal for controlling the over-all gain of video amplifier 18.

The nature of the signal supplied to the input of preamplifier 10 has already been mentioned. The signals in the output of video amplifier 18 are made up of one or more pulse signals of a width equal to the width of the pulses transmitted by the system. Several such pulses may merge to form a pulse of longer duration than the transmitted pulses but this does not affect the operation of the invention. These signals may include one or more high amplitude peaks which should be held equal to but not above the level that will produce an indication of maximum brightness on the screen of indicator 22 and, in addition, one or more peaks having an amplitude just above the noise level of the receiver. These latter signals should be amplified to the extent that they will produce a visible indication on the screen of indicator 22.

Amplitude selector 30 responds to the signal pulses having the largest amplitude and provides a signal which is indicative of the difference between the maximum amplitude of these signals and the reference level determined by the setting of potentiometer 32. Gain control circuit 20 responds to the signal from amplitude selector 30 and causes the gain of amplifier 18 to change in a direction to minimize the above-mentioned difference. This action insures that the maximum amplitude signals do not exceed the saturation level of the indicator. AGC circuit 12 responds to gate signals received from timing circuit 26 to accept signals from the output of video amplifier 18 at a time when video signals representing reflecting objects in space normally do not occur. Therefore the signals accepted by gain control circuit 12 are largely if not entirely random noise which, in the present system, should produce a signal which is barely visible on the screen of indicator 22. In other embodiments of the present invention used for different purposes the minimum signal may be derived from some source other than noise, perhaps even the same source that produces the signal of maximum amplitude. Gain control circuit 12 alters the gain of amplifier 10 in a direction to cause the noise signals in the output of amplifier 18 to be at a level determined by the setting of potentiometer 28. This level is preferably but not necessarily the value necessary to produce a barely visible indication on the screen of indicator 22. Changing the gain of amplifier 10 will affect the amplitude of the large amplitude signals controlling the operation of amplitude selector 30. However, the nonlinear characteristics of amplifier 14 will cause the gain of amplifier 10 to have a lesser effect on the amplitude of these larger amplitude signals than does the gain of amplifier 18. Therefore amplitude selector 30 and AGC circuit 20 provide the exclusive control of the amplitude of the large amplitude signals in the output of amplifier 18, and the main but not the exclusive control of the gain of amplifier 18. Gain control circuit 12 provides the exclusive control of the amplitude of signals in the output of amplifier 18 selected by signals from timing circuit 26, and the main but not the exclusive control of the gain of preamplifier 10. It will now be clear that the limits placed on the signal appearing at the output of amplifier 18 are determined solely by the settings of potentiometers 28 and 32. Therefore, while the optimum settings of these potentiometers are determined by the characteristics of the indicator 22 in the system shown in Fig. 1, it is obvious that the substitution of a different utilization device for indicator 22 would require merely a change in the settings of potentiometers 28 and 32, the remainder of the system being wholly unaffected by the change.

Now that the general organization of my invention has been described, reference should be had to Fig. 2 which shows typical circuits for some of the blocks of Fig. 1. In Fig. 2 the signals to be processed are supplied by way of input 40 to the first of three single tuned amplifier stages 42, 44 and 46 which correspond to the gain controlled preamplifier 10 of Fig. 1. These stages are provided with a conventional cathode biasing arrangement and resistance-capacitance interstage coupling. However, other biasing and coupling means may be substituted without departing from the invention. The grid resistors 48 of the three amplifier stages are returned to a biasing network made up of capacitors 50 and series inductors 52. Capacitors 50 and inductors 52 form the coupling network which prevents feedback between the three stages of the preamplifier. The bias signal which controls the gain of these three stages is supplied to the ungrounded side of capacitors 50 through a low-pass filter 54.

The output of stage 46 is supplied to the input of a logarithmic amplifier 56 which corresponds to nonlinear amplifier 14 of Fig. 1. Amplifier 56 is shown in block form since logarithmic amplifier circuits are well known in the art.

The output of amplifier 56 is supplied through a detector 58 to the input of a video amplifier stage 60. Broken line 18 of Fig. 2 indicates the portion of the circuit which corresponds to block 18 of Fig. 1. Again detector 58 is unnecessary if the circuit operates within a single frequency range. As shown in Fig. 2, video amplifier stage 60 includes the usual cathode bias circuit 62 and anode load impedance 64. The signal from detector 58 is supplied to the grid of stage 60 through a conventional coupling network made up of capacitor 66 and resistor 68. The output of stage 60 is supplied to the utilizing device through a D.-C. blocking capacitor 70.

The signal from the anode of stage 60 is supplied to the input of the cathode follower 72, which forms a part of the amplitude selector-AGC circuit 30—20 of Fig. 1. This cathode follower provides a low impedance source for driving the circuits which follow it. A series circuit comprising resistor 74 and capacitor 76 is connected to the output of cathode follower 72. A potentiometer 78, provided with a movable tap 80, supplies a reference signal to control the amplitude selection level. A diode vacuum tube 82 has its cathode connected to tap 80, and its anode to the junction of resistor 74 and capacitor 76. In the circuit of Fig. 2, tap 80 is adjusted until the potential appearing thereon is equal to the maximum amplitude of the signal to be supplied to the utilizing device. The control grid of cathode follower stage 84 is connected to the junction of resistor 74 and capacitor 76. The cathode load resistor 86 of stage 84 is returned to a negative potential. A diode rectifier 88, having a resistor-capacitor load 90 connected to the anode thereof, has its cathode connected to the output of cathode follower stage 84.

The amplitude selector-AGC circuit 30—20 operates in the following manner. In the example assumed earlier, the video signals appearing at the output of amplifier 60 are positive pulses of relatively short duration. These pulses occur in a recurrent series at a rate determined by the pulse repetition frequency of the radar system. The pulses result from the reception of object reflected echoes of targets, the amplitudes of the pulses within each series being determined by the nature of the object causing reflection and the distance from the radar system to the object. It will be remembered that the object of the invention is to amplify the received signals to the point at which the maximum amplitude attained by a signal within any selected time interval is exactly equal to some preselected value, and all received signals of lesser than maximum amplitude result in output signals having amplitudes less than this maximum value but still representative of the relative amplitudes of the received signals. In the case of a scanning system, the interval selected may be that of an entire antenna scan so that all signals appearing on a PPI indicator, for example, will appear in their proper relative brightnesses. In a non-scanning system the interval may be reduced to one interpulse period of the radar system since all objects are illuminated by every transmitted pulse. In a servo system the interval may be any cyclic period if one exists, or it may be any arbitrarily selected interval if no definite cyclic intervals exist.

The tap 80 is set so that the potential appearing thereon is equal to the preselected maximum value. If all of the pulses appearing at the output of cathode follower 72 are below this value, the D. C. bias developed across resistor 74 will be zero. Therefore the grid of cathode follower 84 will be at ground potential. The cathode of tube 84 will be approximately at ground potential under these circumstances and the potential across resistor 90 will be zero. The positive pulses on the grid of tube 72 result in positive pulses at the cathode of tube 84. These positive pulses cause the cathode of tube 88 to be more positive than the anode so that no potential is developed across load 90. Under these conditions the gain of amplifier 60 is high.

Now suppose that the pulses of maximum amplitude in the output of tube 60 are at a level above that set by tap 80. Under these circumstances tube 82 conducts as soon as the anode exceeds the potential of the cathode. Capacitor 76 charges through the comparatively low impedance of tube 82. The result is that a negative bias is developed across resistor 74, this bias being such that the peaks of the maximum amplitude signals which also appear across resistor 74 are at the potential set by tap 80. In other words, tube 82 and the associated circuitry clamp the peaks of the maximum amplitude signals at the level set by tap 80 by developing a negative bias across resistor 74 which is equal to the amount by which the amplitude of the pulses appearing at the cathode 72 exceed this level. The negative signal on the grid of tube 84 drives the cathode of this stage and the cathode of tube 88 negative with respect to ground. This results in a bias being developed across load 90 which is proportional to the amount by which the signals in the output of stage 60 exceed the desired level. This bias is in a direction which tends to reduce the gain of stage 60 and hence reduce the maximum amplitude of the pulses in the output of this stage. The time constant of load 90 will usually be long compared to the time constant of the circuit made up of capacitor 76 and resistor 74 so that diode 88 is necessary in order to maintain the bias across load 90 for the desired interval even though the negative bias across resistor 74 decreases in the absence of additional pulses having amplitudes equal to or in excess of the pulse which initially developed the bias across load 90. As mentioned earlier, the circuit just described illustrates one preferred form of the present invention, but in its broadest scope it is not limited to the particular amplitude selector-AGC circuit 30—20 shown in Fig. 2 since other circuits for performing the functions described are known in the art.

The output of stage 60 is also supplied to one grid of a gated cathode follower stage 92. A timing signal is supplied to a second grid of stage 92 over lead 94. As shown in Fig. 2 the grid to which these timing signals are supplied is returned to a negative potential which holds stage 92 cut off except during the intervals when positive pulses are supplied over lead 94. The signals appearing at the cathode of stage 92 are similar to the signals appearing at the cathode of stage 72 except for the fact that they occur only at spaced intervals and the pulses are short duration noise pulses rather than video pulses. A series resistor-capacitor circuit 96—98, corresponding in function to resistor-capacitor circuit 74—76, is connected to the output of stage 92. A second potentiometer 100 having a movable tap 102 provided thereon is connected between ground and a source of positive potential to provide a reference signal against which the signals appearing at the cathode of stage 92 are compared. A diode 104, which serves the same function as diode 82, is connected between the tap 102 and the junction of resistor 96 and capacitor 98. Resistor-capacitor circuit 96—98 is followed by a cathode follower stage 106, a diode rectifier 108 and a rectifier load circuit 110, which correspond to stage 84, rectifier 88 and load 90 described earlier. The D. C. bias potential appearing across load 110 is supplied to the ungrounded side of capacitor 50 through low-pass filter 54. Low-pass filter 54 has a cut-off frequency well below the frequency of the timing signals supplied to terminal 94 so that the effect of these timing signals may not appear at the grids of stages 42, 44 and 46.

It will be noted that, except for the gating circuit associated with the stage 92, the circuit supplying the gain control signal to filter 54 is identical in appearance to the circuit supplying the gain control signal to resistor 68. However, it should be remembered that these two circuits work at very different signal levels, the tap 80, for example, being set to the maximum desired video signal, and tap 102 being set to the maximum desired noise signal which is usually smaller in amplitude than the minimum video signal. Under some circumstances it may be desirable to insert additional amplifier means in the last-described AGC circuit to increase the signal available for controlling the gain of preamplifier 10. The amount of amplification required will depend of course on the control characteristics of tubes 42, 44 and 46. In other instances it may be desirable to insert a signal divider circuit between the output of stage 60 and the input of stage 72. Under these conditions the ratio of the amplitude of the reference signal supplied by potentiometer 78 to the amplitude of the signal at the output of stage 60 would be determined by the division ratio of the signal divider. In the preferred form of the invention the two gain control circuits are made alike to simplify the circuitry and to expedite servicing and adjustment of the system. However, there is nothing in the operation of the invention that requires them to be alike and no limitations should be inferred to the circuits chosen for illustrating a specific embodiment of the invention. If detector 16 is not included and amplifier 18 is replaced by an intermediate frequency amplifier, detectors may be provided in each of the two gain control circuits or a single detector may be provided between the output of the I. F. amplifier which replaces amplifier 18 and the two gain control circuits.

As indicated in the description of the circuit of Fig. 1, tap 80 is adjusted to set the maximum amplitude of signals processed by the system, and tap 102 is set to control the minimum amplitude of the signals processed by the system. In both Figs. 1 and 2 signals of minimum amplitude are separated by the process of time selection.

It is obvious that it would lie within the scope of the invention to replace the AGC circuit 12 with a circuit which would respond to the minimum amplitude of signals supplied thereto without reference to a timing signal. Furthermore it would be possible to control the two control circuits by signals having amplitudes different from the desired maximum and minimum values but related to these values in some determinable way.

Therefore, while there have been described what are at present believed to be the preferred embodiments of the invention, reference should be made to the hereinafter appended claims for a definition of the limits of the invention.

What is claimed is:

1. A system for controlling the dynamic range of signals which normally attain a relatively low maximum amplitude during certain spaced time intervals and which normally attain a higher maximum amplitude during intervals intermediate said first-mentioned intervals, said system comprising first, second and third amplifier means connected in cascade, said second amplifier means being intermediate said other two amplifier means, a first source of reference signal, means responsive to the signal from said first source and the output signal of said cascade arrangement and connected to said third amplifier means for controlling the gain thereof, a gate circuit coupled to the output of said cascade arrangement, means connected to said gate circuit for rendering said gate circuit operative to pass signals at intervals during which said signal to be processed normally attains a relatively low maximum amplitude, a second source of reference signal, means responsive to both the output of said gate circuit and the signal from said second source and connected to said first amplifier means for controlling the gain thereof, said first gain control means being responsive to signals supplied thereto which exceed the amplitude of the reference signal from said first source to reduce the gain of said third amplifier means, said second gain control means being responsive to signals supplied thereto which exceed the amplitude of said reference signal from said second source to reduce the gain of said first amplifier means, said second amplifier means having a gain characteristic such that large amplitude signals passing therethrough are amplified by a different amount than small amplitude signals.

2. In combination with a source supplying signals which normally attain a relatively low maximum amplitude during certain spaced time intervals and which normally attain a higher maximum amplitude during intervals intermediate said first-mentioned intervals, a system for amplifying said signals comprising first, second and third amplifier means connected in cascade, said second amplifier means being intermediate said other two amplifier means, means coupling said source to the input of the initial amplifier means in said cascade arrangement, means for controlling the gain of said first amplifier means, said gain controlling means comprising a normally blocked gating circuit, means for supplying a signal to unblock said gating circuit at intervals during which the signal from said source normally attains a relatively low maximum amplitude, means coupling the output of said cascade arrangement to the input of said gating circuit, a source of a first reference signal, means responsive to the output of said gating circuit and said first reference signal for providing an output signal proportional to the amount, if any, by which the signal from said gating circuit exceeds said first reference signal, means responsive to the output signal of said last-mentioned means for generating a substantially constant bias signal proportional in amplitude to the maximum amplitude attained by said last-mentioned output signal within a pre-selected interval, and means for supplying said bias signal to said first amplifier means to control the gain thereof, second gain controlling means for controlling the gain of said third amplifier means, said second gain controlling means comprising, a source of a second reference signal, means responsive to the output signal of said cascade arrangement and said second reference signal for providing an output signal proportional to the amount, if any, by which the amplitude of said output signal of said cascade arrangement exceeds the amplitude of said second reference signal, means for generating a substantially constant bias signal proportional in amplitude to the maximum amplitude attained by the signal from said last-mentioned means occurring within a preselected time interval and means for supplying said last-mentioned bias signal to said third amplifier means to control the gain thereof, said second amplifier means having a gain characteristic such that large amplitude signals passing therethrough are amplified by a different amount than small amplitude signals.

3. A signal amplifier comprising a first variable gain amplifier means, a logarithmic amplifier means, and a second variable gain amplifier means connected in cascade in the order recited, a first cathode follower circuit coupled to the output of said second variable gain amplifier means, a first amplitude selector circuit coupled to the output of said first cathode follower circuit, said first amplitude selector circuit including a load impedance, a source of a first reference potential and means for developing a signal across said load impedance which is proportional to the amount by which the amplitudes of signals at the output of said first cathode follower circuit exceed said first reference potential, means associated with said load impedance for developing a substantially constant bias potential which is proportional to the maximum signal developed across said load impedance within a selected time interval, means coupling said bias developing means to said second variable gain amplifier means thereby to control the gain of said second variable gain amplifier means in accordance with the amplitude of said bias potential, a gated cathode follower circuit coupled to the output of said second variable gain amplifier means, means for supplying a gating signal to said gated cathode follower circuit thereby to render it operative to pass signals from said second variable gain amplifier means, a second amplitude selector circuit coupled to the output of said gated cathode follower circuit, said second amplitude selector circuit including a load impedance, a source of a second reference potential and means for developing a signal across said last-mentioned load impedance which is proportional to the amount by which the amplitudes of signals passed by said gated cathode follower circuit exceed said second reference potential, means associated with said last-mentioned load impedance for developing a second substantially constant bias potential which is proportional to the maximum signal developed across said last-mentioned load impedance within a selected time interval and means coupling said last-mentioned bias developing means to said first variable gain amplifier means thereby to control the gain of said first variable gain amplifier means in accordance with the amplitude of said second bias potential.

4. A system for controlling the dynamic range of signals comprising first, second and third amplifier means arranged in cascade in the order recited, said second amplifier having a gain characteristic which is a continuous, non-zero function of signal amplitude within a selected range, said characteristic being such that large amplitude signals within said range supplied to the input thereof are amplified to a different degree than small amplitude signals within said range, first and second gain controlling means coupled to said first and third amplifier means respectively, for simultaneously controlling the respective gains of said first and third amplifier means, said first gain control means being responsive only to signals in an amplitude range receiving greater amplification in said second amplifier means for controlling the gain of said first amplifier means to cause signals at the output of said cascade arrangement having amplitudes at one extreme of the dynamic range to have an amplitude equal to a first preselected value, said second gain controlling means being responsive only to signals in an amplitude range receiving lesser amplification in said second amplifier means for controlling the gain of said third amplifier means to cause signals at the output of said cascade arrangement having amplitudes at the other extreme of the dynamic range to have an amplitude equal to a second preselected value.

5. A system for controlling the dynamic range of signals comprising first, second and third amplifier means arranged in cascade in the order recited, said second amplifier means having a gain characteristic which is a continuous, non-zero function of signal amplitude within a selected amplitude range, said characteristic being such that large amplitude signals within said range supplied to the input thereof are amplified to a different degree than small amplitude signals within said range, first and second gain controlling means coupled to said first and third amplifier means for simultaneously controlling the gain of said first and third amplifier means, means coupled to the output of said cascade arrangement for supplying to one of said gain controlling means at least selected signals of relatively large amplitude occurring at the output of said cascade arrangement, and means for supplying to the other of said gain controlling means only selected signals of lesser amplitude occurring at the output of said cascade arrangement, said first gain controlling means being supplied with the group of selected signals receiving the greater amplification in said second amplifier means, the gain controlling characteristic of said first gain control means being such that signals at the output of said cascade arrangement having amplitudes at one extreme of the dynamic range have an amplitude equal to a first preselected value and the gain controlling characteristic of said second gain control means being such that signals at the output of said cascade arrangement having amplitudes at the other extreme of the dynamic range have an amplitude equal to a second preselected value.

6. A system according to claim 1 wherein said second amplifier means amplifies small signals to a greater degree than large signals and wherein said third amplifier means follows said second amplifier means in said cascade arrangement.

7. A system according to claim 2 wherein said second amplifier means amplifies small signals to a greater degree thna large signals and wherein said third amplifier means follows said second amplifier means in said cascade arrangement.

8. A system for amplifying signals comprising first, second and third amplifier means connected in cascade with said second amplifier means intermediate said other two amplifier means, said second amplifier means having a gain characteristic which is a continuous function of signal amplitude, said characteristic being such that all signals within a selected amplitude range are amplified, the signals at lower amplitudes within said range being amplified to a different degree than signals at higher amplitudes within said range, means coupled to said third amplifier means and the output of said cascade arrangement for controlling the gain of said third amplifier means, said gain controlling means being responsive to the output signal of said cascade arrangement to cause the gain of said third amplifier means to be a function of the maximum amplitude attained by a signal at the output of said cascade arrangement within a selected time interval, means coupled to the output of said cascade arrangement for selecting signals having an amplitude less than said maximum amplitude, and second gain control means coupled to the output of said signal selecting means and to said first amplifier means for controlling the gain of said first amplifier means, said second gain controlling means being responsive to the output of said signal selecting means to cause the gain of said first amplifier means to be a function of the maximum amplitude attained by said selected signals.

9. A system for amplifying signals as in claim 8 wherein said signal selecting means comprises a gate means, and means to cause said gate means to pass signals only during preselected periods.

10. A system for amplifying signals which normally attain a relatively low maximum amplitude during certain spaced time intervals and which normally attain a higher maximum amplitude during intervals intermediate said first mentioned intervals, said system comprising first, second and third amplifier means connected in cascade with said second amplifier means intermediate said other two amplifier means, said second amplifier means having a gain characteristic which is a continuous function of signal amplitude, said characteristic being such that all signals within a selected amplitude range are amplified, the signals at lower amplitudes within said range being amplified to a different degree than signals at higher amplitudes within said range, means coupled to said third amplifier means and to the output of said cascade arrangement for controlling the gain of said third amplifier means, said gain controlling means being constructed and arranged to cause the gain of said third amplifier means to be a function of the maximum amplitude attained by a signal at the output of said cascade arrangement within a selected time interval, means for sampling the output of said cascade arrangement during intervals short compared to said selected time interval in which said signals normally attain a relatively low maximum amplitude, means coupled to said sampling means and said first amplifier means for controlling the gain of said first amplifier means, said last-mentioned gain controlling means being constructed to cause the gain of said first amplifier means to be a function of the maximum amplitude attained by signals passed by said sampling means within a given time interval.

11. A system for amplifying signals as claimed in claim 10 wherein said second amplifier amplifies smaller signals to a greater degree than larger signals, and wherein said third amplifier follows said second amplifier in said cascade arrangement.

12. A system for controlling the dynamic range of signals which normally attain a relatively low maximum amplitude during certain spaced time intervals and which normally attain a higher maximum amplitude during intervals intermediate said first mentioned interval, said system comprising first, second and third amplifier means connected in cascade, said second amplifier means being intermediate said other two amplifier means, said second amplifier having a gain characteristic which is a continuous function of signal amplitude, said characteristic being such that all signals within a selected range are amplified, the signals at lower amplitudes within said range being amplified to a different degree than signals at a higher amplitude within said range, a first source of reference signal, means coupled to said source, the output of said cascade arrangement and said third amplifier means for controlling the gain of said third amplifier means, said gain controlling means being constructed and arranged to control the gain of said third amplifier to maintain a predetermined relationship between the maximum amplitude attained by signals appearing at the output of said cascade arrangement within a preselected time interval and the amplitude of the reference signals supplied by said first source, means for sampling the output of said cascade arrangement during intervals in which said signals normally have a relatively low maximum amplitude, a second source of reference signal, means coupled to said second source, said sampling means and said first amplifier means for controlling the gain of said first amplifier means, said last-mentioned gain controlling means being constructed and arranged to control the gain of said first amplifier to maintain a predetermined relationship between the maximum amplitude of the signals at the output of said sampling means and the amplitude of the reference signals supplied by said second source.

13. A system for amplifying signals comprising first, second and third amplifier means connected in cascade with said second amplifier means intermediate said other two amplifier means, said second amplifier means having a gain characteristic which is a continuous function of signal amplitude, said characteristic being such that all signals within a selected amplitude range are amplified, the signals at lower amplitudes within said range being amplified to a different degree than signals at higher amplitudes within said range, means for establishing first and second reference levels for signals at the output of said cascade arrangement, means coupled to said reference level establishing means and to the output of said cascade arrangement for generating a first difference signal indicative of the difference between the maximum amplitude attained by a signal at the output of said cascade arrangement during a preselected time interval and said first reference level, means coupled to said third amplifier means and said difference generating means for controlling the gain of said third amplifier means in response to said first difference signal and in a sense tending to reduce the magnitude of said first difference signal, means coupled to the output of said cascade arrangement for selecting signals having amplitudes less than said maximum amplitude, means coupled to said reference level establishing means and the output of said signal selecting means for generating a second difference signal indicative of the difference between the maximum amplitude attained by said signals at the output of said signal selecting means and said second reference level, and second gain controlling means coupled to said first amplifier means and said means for generating said second difference signal for controlling the gain of said first amplifier means in response to said second difference signal and in a sense tending to reduce the magnitude of said second difference signal.

14. A system for amplifying signals as claimed in claim 13 wherein said signal selecting means comprises a gate means, and means to cause said gate means to pass signals only at selected times.

References Cited in the file of this patent

UNITED STATES PATENTS

| 2,492,363 | Kellogg | Dec. 27, 1949 |
| 2,611,081 | Spencer | Sept. 16, 1952 |

FOREIGN PATENTS

| 526,173 | Great Britain | Sept. 12, 1940 |

UNITED STATES PATENT OFFICE

CERTIFICATE OF CORRECTION

Patent No. 2,866,015 December 23, 1958

Robert W. Sailor, Jr.

It is hereby certified that error appears in the printed specification of the above numbered patent requiring correction and that the said Letters Patent should read as corrected below.

Column 1, line 22, for "designated" read -- designed --; column 2, line 54, for "togther" read -- together --; line 66, for "operiaton" read -- operation --; column 3, line 22, after "intermediate" insert -- frequency --; column 7, line 41, for "top" read -- tap --; column 10, line 45, for "thna" read -- than --.

Signed and sealed this 28th day of June 1960.

(SEAL)
Attest:

KARL H. AXLINE
Attesting Officer

ROBERT C. WATSON
Commissioner of Patents